US010616642B2

(12) United States Patent
Izutsu

(10) Patent No.: US 10,616,642 B2
(45) Date of Patent: Apr. 7, 2020

(54) LIVE VIDEO DISTRIBUTION SYSTEM

(71) Applicant: DAP REALIZE INC., Tokyo (JP)

(72) Inventor: Masahiro Izutsu, Tokyo (JP)

(73) Assignee: DAP REALIZE INC., Tokyo (JP)

( * ) Notice: Subject to any disclaimer, the term of this patent is extended or adjusted under 35 U.S.C. 154(b) by 15 days.

(21) Appl. No.: 14/895,353

(22) PCT Filed: May 31, 2014

(86) PCT No.: PCT/JP2014/064549
§ 371 (c)(1),
(2) Date: Dec. 2, 2015

(87) PCT Pub. No.: WO2014/196483
PCT Pub. Date: Dec. 11, 2014

(65) Prior Publication Data
US 2016/0119670 A1    Apr. 28, 2016

(30) Foreign Application Priority Data
Jun. 7, 2013 (JP) .................................. 2013-120449

(51) Int. Cl.
*H04N 21/437* (2011.01)
*H04N 5/232* (2006.01)
(Continued)

(52) U.S. Cl.
CPC .......... *H04N 21/437* (2013.01); *H04N 5/232* (2013.01); *H04N 5/23206* (2013.01);
(Continued)

(58) Field of Classification Search
CPC .... H04N 5/232; H04N 5/23206; H04N 7/181; H04N 21/21805; H04N 21/2187;
(Continued)

(56) References Cited

U.S. PATENT DOCUMENTS 6,414,716 B1 *   7/2002   Kawai ................... H04N 5/232
                                                           348/14.09
7,312,766 B1 * 12/2007   Edwards .............. G02B 27/017
                                                           248/115
(Continued)

FOREIGN PATENT DOCUMENTS

CN        102158690        8/2011
JP        11-234659        8/1999
(Continued)

OTHER PUBLICATIONS

Extended European Search Report dated Nov. 21, 2016 in European Application No. 14807623.5.
(Continued)

*Primary Examiner* — Hai V Tran
(74) *Attorney, Agent, or Firm* — Wenderoth, Lind & Ponack, L.L.P.

(57) ABSTRACT

A live video distribution system has an on-the-spot system including a video signal generating means for generating video signals of a plurality of systems having different display ranges and a communicating means, and a plurality of terminal apparatuses each including a video display means, a display range setting signal generating means, and a communicating means. The systems of the video signals and the terminal apparatuses are associated with each other, the on-the-spot system has a function to determine the display ranges of the video signals of the respective systems on the basis of display range setting signals generated by the terminal apparatuses associated with the respective systems, and a function to send the video signals. Each of the terminal apparatuses can send the display range setting signal, can receive the video signal of the system associated with the terminal apparatus itself, and can display a video image based on the video signal.

3 Claims, 4 Drawing Sheets

(51) Int. Cl.
*H04N 21/2187* (2011.01)
*H04N 21/218* (2011.01)
*H04N 21/4728* (2011.01)
*H04N 21/6587* (2011.01)
*H04N 21/214* (2011.01)
*H04N 7/18* (2006.01)

(52) U.S. Cl.
CPC ........... *H04N 7/181* (2013.01); *H04N 21/214* (2013.01); *H04N 21/2187* (2013.01); *H04N 21/21805* (2013.01); *H04N 21/4728* (2013.01); *H04N 21/6587* (2013.01)

(58) Field of Classification Search
CPC .. H04N 21/214; H04N 21/6125; H04N 7/147; G08B 13/19656; G08B 13/19689; H04H 40/18; H04H 60/02
See application file for complete search history.

(56) References Cited

U.S. PATENT DOCUMENTS

| | | | | |
|---|---|---|---|---|
| 8,439,301 | B1* | 5/2013 | Lussier | B64F 1/02 244/63 |
| 2002/0178116 | A1 | 11/2002 | Yamasaki | |
| 2003/0231244 | A1 | 12/2003 | Bonilla et al. | |
| 2004/0163118 | A1 | 8/2004 | Mottur | |
| 2005/0258942 | A1* | 11/2005 | Manasseh | G07C 5/008 340/425.5 |
| 2006/0078329 | A1 | 4/2006 | Ohnishi et al. | |
| 2007/0124783 | A1 | 5/2007 | Ahiska et al. | |
| 2007/0291109 | A1 | 12/2007 | Wang et al. | |
| 2007/0291128 | A1 | 12/2007 | Wang et al. | |
| 2009/0125147 | A1 | 5/2009 | Wang et al. | |
| 2012/0163287 | A1* | 6/2012 | Raaf | H04B 7/155 370/315 |
| 2012/0229660 | A1 | 9/2012 | Matthews et al. | |
| 2013/0109399 | A1* | 5/2013 | Waz-Ambrozewicz | H04B 7/0695 455/452.1 |

FOREIGN PATENT DOCUMENTS

| | | |
|---|---|---|
| JP | 2002-101333 | 4/2002 |
| JP | 2002-293298 | 10/2002 |
| JP | 2003-134505 | 5/2003 |
| JP | 2006-67393 | 3/2006 |
| JP | 2007-47136 | 2/2007 |
| JP | 2009-540759 | 11/2009 |
| JP | 2010-108433 | 5/2010 |
| RU | 2 558 381 | 7/2015 |

OTHER PUBLICATIONS

International Search Report dated Sep. 2, 2014 in corresponding International Application No. PCT/JP2014/064549 (with English translation).
Extended European Search Report dated Jan. 21, 2020 in European Application No. 19202352.1.

* cited by examiner

LIVE VIDEO DISTRIBUTION SYSTEM

TECHNICAL FIELD

The present invention relates to a live video distribution system, and more particularly to a live video distribution system which makes it possible for a plurality of users present at distant places to simultaneously observe a separate target on the spot in real time. More specifically, the present invention is concerned with a live video distribution system for allowing users present at distant places to enjoy a video image in a realistic fashion as if they are observing the video image while they are in motion on the spot themselves.

BACKGROUND ART

Tourism is now taking up about 10% of the GDP of the entire world, and is predicted to become the largest industry in the 21st century from now on.

Under the circumstances, there have been growing needs for tourism not only in conventional tourist spots, but also in unexplored places and frontier spaces such as space and deep sea.

However, if many tourists rush in to crowd into secluded places, then they tend to suffer problems in that rare natural environments and precious ruins are likely to be destroyed. Sightseeing in frontier spaces such as cosmic space and deep sea is not only costly because the tourists have to go to actual sightseeing spots, but also excessively physically burdensome for the tourists owing to surrounding environments including zero gravity and high atmospheric pressure to which they are to be exposed, and risky in that the lives of the tourists may be put in jeopardy in the event that a vehicle (such as a spacecraft or a deep ocean research vehicle) for carrying the tourists to a sightseeing spot is broken.

One solution to the above problems would be to give users at distance places a pseudo-sightseeing experience by displaying the image of a sightseeing spot for the tourists. However, if the display range of a video image that is displayed is set by a person other than the users, then the displayed video image remains the same as those of videophone and live television broadcasts, but is far from the "sightseeing experience". In order to give users a pseudo-sightseeing experience, it is necessary to provide a live video distribution system which allows users at distant places to set the display image of a video image by themselves and to observe, in real time, a target that the users want to observe.

Heretofore, there have been proposed live video distribution systems which allow a user at a distant place to set the display image of a video image by themselves, such as "remote monitoring camera" disclosed in Patent document 1 (hereinafter referred to as "Prior art 1") and "monitor system using unmanned helicopter" disclosed in Patent document 2 (hereinafter referred to as "Prior art 2").

However, since these conventional systems have a device for capturing a video image and a device for displaying a video image, which are provided as a pair, only one user at a time is capable of setting the display range of a video image. As a result, the conventional systems are unable to let a plurality of users simultaneously observe a separate target on the spot.

Of the conventional systems, the device for displaying a video image is of the type for displaying a video image on a screen (e.g., a CRT display, an FDP, a projector, or the like). The user stays still and sees a video image displayed on the screen while fixing its line of sight to the screen. Consequently, even though the user can move the display range of the video image, the motion of the display range of the video image, and the motion of the body of the user and the motion of the line of sight are not linked to each other at all. The user cannot enjoy the displayed video image in a realistic manner as if the user is observing the target on the spot themselves.

According to Prior art 1, in particular, a monitor camera 1 for capturing a video image is fixedly mounted on a camera platform 2. Inasmuch as the viewpoint cannot be moved though the line of sight along which the target is observed can be moved, images that are displayed on a video display 7 are limited to those of observation targets that are present around the camera platform 2. According to Prior art 2, an image signal is directly transmitted through a wireless link from an image transmitter 5 on an unmanned helicopter H to an image receiver 6 on the image display 7. Therefore, the system according to Prior art 2 is problematic in that the distance between the site where the observation target is present and the distant place where the user is present cannot be greater than the distance over which the wireless image signal can be transmitted.

The terms "image capturing range", "vantage point", "line of sight", and "viewpoint (center of the image capturing range)" used in the present description and the scope of claims for patent are referred to in FIG. 4 of the accompanying drawings.

CITATION LIST

Patent Literature

Patent document 1: Japanese laid-open patent publication No. 11-234659
Patent document 2: Japanese laid-open patent publication No. 2002-293298

SUMMARY OF INVENTION

Technical Problem

The present invention has been made in view of the above problems. It is an object of the present invention to provide a live video distribution system which makes it possible for a plurality of users present at distant places to simultaneously observe a separate target on the spot in real time. More specifically, it is an object of the present invention to provide a live video distribution system which can be used even when the distance between a spot where there is an observation target and a distant place where there is a user is large.

It is an object of the present invention to provide a live video distribution system which is capable of moving freely a line of sight and a vantage point for observation on the spot. More specifically, it is an object of the present invention to provide a live video distribution system which makes it possible for users present at distant places to enjoy a video image in a realistic fashion as if they are observing the video image while they are in motion on the spot themselves.

Solution to Problem

In order to achieve above objectives, according to a first aspect of the present invention related to a live video distribution system, there is provided a live video distribution system comprising: an on-the-spot system which is equipped with a video signal generating means for generating video signals of a plurality of systems having different display ranges and a communicating means 1 to exchange signals with a public network; and a plurality of terminal apparatuses which are equipped with a video display means, a display range setting signal generating means and a communicating means 2 to exchange signals with a public network; wherein the systems of the video signals generated by the video signal generating means of said on-the-spot system and said terminal apparatus are associated with each other; said on-the-spot system has the following functions: a function to determine the display range of the video signal of said respective system on the basis of display range setting information represented by the display range setting signal that is generated by the display range setting signal generating means of said terminal apparatus that is associated with the respective system and is received via a public network; and a function to send the video signal generated by said video signal generating means to a public network; and said terminal apparatus has the following functions: a function to send display range setting signal generated by said display range setting signal generating means to a public network; a function to receive the video signal of the system that is associated with the terminal apparatus itself, among video signal generated by the video signal generating means of said on-the-spot system, via a public network; and a function to display a video image on the basis of video information represented by said received video signal.

And in order to achieve above objectives, according to a second aspect of the present invention related to a live video distribution system, there is provided a live video distribution system comprising: an on-the-spot system which is equipped with a video signal generating means for generating video signals of a plurality of systems having different display ranges and a communicating means 1' to exchange signals with aftermentioned relay apparatus; a relay apparatus which is equipped with a communicating means 3A to exchange signals with said on-the-spot system and a communicating means 3B to exchange signals with a public network; and a plurality of terminal apparatuses which are equipped with a video display means, a display range setting signal generating means and a communicating means 2 to exchange signals with a public network; wherein the systems of the video signals generated by the video signal generating means of said on-the-spot system and said terminal apparatus are associated with each other; said on-the-spot system has the following functions: a function to determine the display range of the video signal of said respective system on the basis of display range setting information represented by the display range setting signal that is generated by the display range setting signal generating means of said terminal apparatus that is associated with the system and is received via a public network and said relay apparatus; and a function to send the video signal generated by said video signal generating means to said relay apparatus; and said terminal apparatus has the following functions: a function to send display range setting signal generated by said display range setting signal generating means to a public network; a function to receive the video signal of the system that is associated with the terminal apparatus itself, among video signal generated by the video signal generating means of said on-the-spot system, via a public network and said relay apparatus; and a function to display an image on the basis of video information represented by said received video signal.

In the first and the second aspect of the present invention, the video signal generating means of the on-the-spot system can comprise the following means: an image capturing means comprised of image sensors, such as CCD (Charge Coupled Device) and CMOS (Complementary Metal Oxide Semiconductor), to convert incident light to electric signal; and a video signal converting means to convert a captured-image electric signal to an uncompressed video signal and to convert the uncompressed video signal to a compressed video signal, wherein "a captured-image electric signal" means "an electric signal from an image capturing means", "an uncompressed video signal" means "an uncompressed video signal transmitted in a transmission system such as digital RGB, LVDS (Low Voltage Differential Signaling) (or LDI (LVDS Display Interface)), GVIF (Gigabit Video Inter-Face), USB (Universal Serial Bus), DisplayPort, WirelessHD (High Definition), WHDI (Wireless Home Digital Interface) and WiGig (Wireless Gigabit)", and "compressed video signal" means "a video signal which is compressed and coded in the standard such as H.261, H.263, H.264, MPEG (Moving Picture Experts Group)-1、MPEG-2 and MPEG-4". In this case, said compressed video signal is sent from the communicating means 1 of the on-the-spot system to a public network, or said compressed video signal is sent from the communicating means 1' of the on-the-spot system to the relay apparatus.

A video signal of a 3D video image can be sent by composing the image capturing means of a plurality of image sensors.

The image capturing means can comprise a wide angle camera such as a half-sky camera and a whole-sky camera. And the video signal generating means can be configured to clip a captured-image electric signal of an image capturing range corresponding to the display range, that is determined on the basis of display range setting information represented by the display range setting signal, from a captured-image electric signal generated by a wide angle camera and then to convert the clipped captured-image electric signal to a video signal. Also the video signal generating means can be configured to convert a captured-image electric signal to a video signal and then to clip a video signal of the display range, that is determined on the basis of display range setting information represented by the display range setting signal, from the converted video signal.

A network comprising the Internet and an access network (a mobile access network and/or a fixed-line access network) can be used as a public network. And a public wireless LAN or an access network using cellular telephone line such as 3G and LTE (Long Term Evolution) can be used as a mobile access network. And an access network using FTTH (Fiber To The Home), CATV (Cable TeleVision) and DSL (Digital Subscriber Line) can be used as a fixed-line access network.

In the case that a public network includes the Internet, video signal is desirably sent in IP packet format.

An association of systems of the video signals and terminal apparatuses can be realized by that respective terminal apparatus is given an IP address and setting of the display ranges of the video signals of the respective systems and sending of video signals of the respective systems are done on the basis of the IP address received from the respective terminal apparatus. In this case, especially when a system of video signal is sent from the on-the-spot system, the IP address of the terminal apparatus, that should be associated with the system of the video signal, is designated as a directed IP address.

A CRT (Cathode Ray Tube) display, a FDP (Flat Panel Display) such as an LED (liquid crystal display), an organic EL (Electro-Luminescence) display and a plasma display, a projector and an HMD (Head Mounted Display) can be used as the video display means of the terminal apparatus.

In the case that a video signal, which is generated by the video signal generating means of the on-the-spot system and is received via a public network or a public network and said relay apparatus, is a video signal of a 3D video image, a 3D display device is desirably adopted as the video display means of the terminal apparatus. Especially by adopting immersive (non-permeable) 3D-HMD (HMD supporting 3D video signal) which covers a large area of view field, an immersive visual experience can be provided.

The display range setting signal generating means of the terminal apparatus can comprise a display center setting signal generating means, which generates a display center setting signal to set a center of the display range, and a display width setting signal generating means, which generates a display width setting signal to set an expanse (horizontal and vertical width) of display range. In this case, it is possible either that the terminal apparatus generates the display range setting signal on the basis of information represented by those signals and send it to a public network or that the on-the-spot system receive those signals and determine the display range of a video signal on the basis of information represented by those received signals. Especially in the latter case, the display range setting signal sent from the terminal apparatus comprises a display center setting signal and display width setting signal.

In the case that said video display means is categorized in display devises that display an image on a screen (such as CRT display, FDP, projector), the display range setting signal generating means of the terminal apparatus can be configured to set a center of the display range by moving a cursor by a pointing device such as a mouse and a trackball and to set an expanse of display range by sliding or clicking a magnification scale bar on a screen.

On the other hand, in the case that said video display is a touch panel display, wherein "a touch panel display" means "a display device with a touch panel function", both of the video display means and the display range setting signal generating means can be realized simultaneously by utilizing a touch panel function. In this case, a touch panel display can be configured to set a viewpoint by an operation such as sliding and tapping and to set an expanse of display range by an operation such as pinch-in and pinch-out.

It is possible either that terminal apparatuses are installed dispersedly in such a place as an individual house or that terminal apparatuses are installed collectively in such a place as a tourism center.

Especially in the second aspect of the present invention, signals can be exchanged between the on-the-spot system and the relay apparatus by a wireless or wired dedicated line. In the case the on-the-spot system is located in cosmic space, a communication satellite can be used as the relay apparatus.

Especially in the second aspect of the present invention, in the case that signals are exchanged between the on-the-spot system and the terminal apparatus via the relay apparatus, the relay apparatus can conduct some sort of signal conversion. Therefore, "configuration to receive a signal (signals) via a public network and the relay apparatus" in DESCRIPTION and CLAIMS also implies "configuration that the relay apparatus conducts signal conversion".

In order to achieve above objectives, according to a third aspect of the present invention related to a live video distribution system, there is provided a live video distribution system according to the first or second aspect of the present invention, wherein said terminal apparatus is equipped with a body detecting means to detect a position and a motion of user's body; and wherein said display range setting signal generating means generates a display range setting signal on the basis of the detected result from said body detecting means.

In the third aspect of the present invention, an acceleration sensor and an orientation sensor can be used as the body detecting means of the terminal apparatus. Especially in the case that the video display means of the terminal apparatus is an HMD, the HMD can be configured so that various sensors are built in or attached to it and those sensors detect a motion of a user's head.

In order to achieve above objectives, according to a fourth aspect of the present invention related to a live video distribution system, there is provided a live video distribution system according to the third aspect of the present invention, further comprising a body motion assisting means to assist a motion of user's body.

In the fourth aspect of the present invention, a trampoline and a bungee cord can be used as the body motion assisting means. And a pool filled with water can be also used.

In order to achieve above objectives, according to a fifth aspect of the present invention related to a live video distribution system, there is provided a live video distribution system according to the first aspect of the present invention, wherein said on-the-spot system comprises the following apparatuses: a plurality of slave apparatuses which are equipped with an image capturing means to capture an image in a given image capturing range and a communicating means 1A to exchange signals with after-mentioned master apparatus and/or public network; and a master apparatus which is equipped with a communicating means 1B to exchange signals with said slave apparatus and a communicating means 1C to exchange signals with a public network; wherein said slave apparatus and said terminal apparatus are associated with each other; wherein said slave apparatus has the following functions: a function to determine the image capturing range of said image capturing means on the basis of display range setting information represented by the display range setting signal that is generated by said display range setting signal generating means of said terminal apparatus associated with the slave apparatus itself and is received via a public network or via a public network and said master apparatus; and a function to generate a video signal on the basis of the captured result from said image capturing means and to send the video signal to said master apparatus or a public network; and wherein said terminal apparatus has the following functions: a function to receive the video signal that is generated by said slave apparatus associated with the terminal apparatus itself via a public network or via a public network and said master apparatus; and a function to display a video image on the basis of video information represented by said received video signal.

In the fifth aspect of the present invention, signals can be exchanged between the slave apparatus and the terminal apparatus as described in the following cases:
[Case 1]
video signal: slave apparatus→master apparatus→public network→terminal apparatus
display range setting signal: slave apparatus←master apparatus←public network←terminal apparatus
[Case 2]
video signal: slave apparatus→public network→terminal apparatus
display range setting signal: slave apparatus←master apparatus←public network←terminal apparatus

[Case 3]
video signal: slave apparatus→master apparatus→public network→terminal apparatus
display range setting signal: slave apparatus←public network←terminal apparatus In order to achieve above objectives, according to a sixth aspect of the present invention related to a live video distribution system, there is provided a live video distribution system according to the second aspect of the present invention, wherein said on-the-spot system comprises the following apparatuses: a plurality of slave apparatuses which are equipped with an image capturing means to capture an image in a given image capturing range and a communicating means 1A' to exchange signals with after-mentioned master apparatus; and a master apparatus which is equipped with a communicating means 1B to exchange signals with said slave apparatus and a communicating means 1D to exchange signals with said relay apparatus; wherein said slave apparatus and said terminal apparatus are associated with each other; wherein said slave apparatus has the following functions: a function to determine the image capturing range of said image capturing means on the basis of display range setting information represented by the display range setting signal that is generated by said display range setting signal generating means of said terminal apparatus associated with the slave apparatus itself and received via a public network, said relay apparatus and said master apparatus; and a function to generate a video signal on the basis of the captured result from said image capturing means and to send the video signal to said master apparatus; and wherein said terminal apparatus has the has the following functions: a function to receive the video signal that is generated by said slave apparatus associated with the terminal apparatus itself via a public network, said relay apparatus and said master apparatus; and a function to display a video image on the basis of video information represented by said received video signal.

In the fifth and sixth aspect of the present invention, the on-the-spot system can generate a plurality of systems of video signals having the different display ranges by adopting a configuration that a plurality of slave apparatuses of the on-the-spot system determine the image capturing range of the image capturing means on the basis of display range setting information represented by the display range setting signal, and generate a video signal on the basis of the captured result from the image capturing means.

The image capturing means of the slave apparatus can comprise an image sensors, such as CCD and CMOS, to convert incident light to electric signal.

In the case that video signals are sent to a public network by the communicating means 1A of the slave apparatus, they are desirably compressed video signals. On the other hand, in the case that they are sent to the master apparatus, they are selectable to be compressed video signals or to be uncompressed video signal. And video signals sent from the communicating means 1A' of the slave apparatus to the master apparatus are selectable to be compressed video signals or to be uncompressed video signals.

In the case that the communicating means 1A or the communicating means 1A of the slave apparatus sends uncompressed video signals to the master apparatus, the master apparatus is desirably provided with a signal converting means to convert the uncompressed video signals to compressed and coded video signals. And in that case, the slave apparatus conducts a part of video signal conversion, in which captured-image electric signals are converted to uncompressed video signals, and the master apparatus conducts the remaining part of video signal conversion, in which uncompressed video signals are converted to the compressed video signals.

Signals can be exchanged between the slave apparatus and the master apparatus by a wireless or wired communication.

A wireless or wired LAN router can be used as the communicating means 1C of the master apparatus.

The association between the slave apparatus and the terminal apparatus can be realized by giving an IP address to a respective slave apparatus and the terminal apparatus, fixing the IP address of the associated terminal apparatus as a directed IP address when video signals are sent from the slave apparatus, and fixing the IP address of the associated slave apparatus as a directed IP address when the display range setting signal is sent from the terminal apparatus.

The association of the slave apparatuses and the terminal apparatuses are not necessarily constant but possibly temporal. Nor is it necessary that the association of the slave apparatuses and the terminal apparatuses are exactly one to one. For example, in the case that slave apparatus 1~3 and terminal apparatus A~F exist, the association can be changed through time as illustrated below.
[Time:T1~T2]
slave apparatus 1⇔terminal apparatus A, slave apparatus 2⇔terminal apparatus B、slave apparatus 3⇔terminal apparatus C
[Time:T3~T4]
slave apparatus 1⇔terminal apparatus D, slave apparatus 2⇔terminal apparatus E, slave apparatus 3⇔(any terminal apparatus is associated)
[Time:T5~T6]
slave apparatus 1⇔terminal apparatus A, slave apparatus 2⇔terminal apparatus F、slave apparatus 3⇔terminal apparatus D And the slave apparatus and terminal apparatuses can be configured so that video signals from the slave apparatus are received by a plurality of terminal apparatuses and the video display means of the respective terminal apparatus display a video image on the basis of video information represented by the video signal. In this case, however, it is necessary to be configured so that the display range setting signal can be sent only from one of the terminal apparatuses.

In the case that signals are exchanged between the slave apparatus and the terminal apparatus via the master apparatus or via the master apparatus and the relay apparatus, the master apparatus and/or the relay apparatus can conduct some sort of signal conversion. Therefore, "configuration to receive a signal (signals) via a public network and the master apparatus" or "configuration to receive a signal (signals) via a public network and the master apparatus" in DESCRIPTION and CLAIMS also implies "configuration that the master apparatus and/or the relay apparatus conducts signal conversion".

Especially, "configuration to receive video signals via a public network and the master apparatus" or "configuration to receive video signals via a public network, the relay apparatus and the master apparatus" in DESCRIPTION and CLAIMS also implies "configuration that the slave apparatus sends uncompressed video signals to the master apparatus, and the master apparatus converts the received uncompressed video signals and sends them to the relay apparatus or a public network".

And especially, "configuration to receive the display range setting signal via a public network and the master apparatus" or "configuration to receive the display range setting signal via a public network, the relay apparatus and the master apparatus" in DESCRIPTION and CLAIMS also implies "configuration that the terminal apparatus sends the display range setting primary signal, for example, which comprises a display center setting signal and a display width setting signal, to the master apparatus, and the master apparatus converts the received display range setting primary signal to the display range setting secondary signal and sends to the slave apparatus.

In order to achieve above objectives, according to a seventh aspect of the present invention related to a live video distribution system, there is provided a live video distribution system according to the fifth or the seventh aspect of the present invention, wherein said slave apparatus has a function to generate video signals with different display ranges even in the case that said image capturing means capture images from the same vantage point.

In the seventh aspect of the present invention, the slave apparatus can be configured so tilting and panning in all directions are realized by installing the image capturing means on a 3-way camera platform and by rotating the 3-way camera platform around the around three axis of rotation.

And the slave apparatus can be configured to set a line of sight of the image capturing means by installing the image capturing means on a free camera platform and rotating a ball joint on the free camera platform.

And the slave apparatus can be configured to change an image capturing range of the image capturing means by providing the image capturing means with zooming function and changing zoom rate. And the image capturing means can comprise a wide angle camera such as a half-sky camera and whole-sky camera. In this configuration, the slave apparatus can be configured to clip a captured-image electric signal of a part of image capturing range from a captured-image electric signal generated by the wide angle camera and then to convert the clipped captured-image electric signal to a video signal. Also the slave apparatus can be configured to convert a captured-image electric signal generated by the wide angle camera to a video signal and then to clip a video signal of a part of display range.

In order to achieve above objectives, according to an eighth aspect of the present invention related to a live video distribution system, there is provided a live video distribution system according to the fifth aspect of the present invention, wherein said slave apparatus is equipped with a motion means, wherein "a motion means" means "a means to perform a motion", and wherein "a motion" means "a motion including a translation in an orbit, on a surface or in a space", wherein said terminal apparatus is equipped with a motion control signal generating means and has a function to send the motion control signal, that is generated by the motion control signal generating means, to a public network, and wherein said slave apparatus performs a motion on the basis of motion control information represented by motion control signal that is generated by the motion control signal generating means of the terminal apparatus associated with the slave apparatus itself and is received via a public network or via a public network and said master apparatus.

In the eighth aspect of the present invention, signals can be exchanged between the slave apparatus and the terminal apparatus as described in the following cases:

[Case I]
video signal: slave apparatus→master apparatus→public network→terminal apparatus
motion control signal: slave apparatus←master apparatus←public network←terminal apparatus

[Case II]
video signal: slave apparatus→public network→terminal apparatus
motion control signal: slave apparatus←master apparatus←public network←terminal apparatus

[Case III]
video signal: slave apparatus→master apparatus→public network→terminal apparatus
motion control signal: slave apparatus←public network←terminal apparatus In order to achieve above objectives, according to a ninth aspect of the present invention related to a live video distribution system, there is provided a live video distribution system according to the sixth aspect of the present invention, wherein said slave apparatus is equipped with a motion means, wherein "a motion means" means "a means to perform a motion", and wherein "a motion" means "a motion including a translation in an orbit, on a surface or in a space", wherein said terminal apparatus is equipped with a motion control signal generating means and has a function to send the motion control signal, that is generated by the motion control signal generating means, to a public network, and wherein said slave apparatus performs a motion on the basis of motion control information represented by motion control signal that is generated by the motion control signal generating means of the terminal apparatus associated with the slave apparatus itself and is received via a public network, said relay apparatus and said master apparatus.

In the eight and the ninth aspect of the present invention, the slave apparatus can set a vantage point of the image capturing means by performing a motion on the basis of motion control information represented by motion control signal generated by the motion control signal generating means of the terminal apparatus associated with the slave apparatus itself, and, in result, can set naturally the image capturing range of the image capturing means. Therefore, the motion control signal generated by the terminal apparatus is a type of or a part of the display range setting signal in a live video distribution system according to any one of the first to the fifth aspect of the present invention, and the motion control signal generating means of the terminal apparatus is a type of or a part of the display range setting signal generating means in a live video distribution system according to any one of the first to the seventh aspect of the present invention.

The motion means of the slave apparatus can be configured to translate in an orbit installed inside or outside of the master apparatus, to translate in a translation surface installed inside or outside of the master apparatus, or to float and translate in a certain area of a space inside or outside of the master apparatus. And these configurations can be combined. And also these configurations can be combined with a configuration to perform a rotational motion around an axis of rotation or a center of rotation.

In the case that the slave apparatus floats and translates in a space, a blade type propulsion device, which is used in a helicopter or a propeller aircraft, and a jet type propulsion device, which is used in a jet airplane or a rocket, can be used as the motion means of the slave apparatus.

In the case that the slave apparatus floats and translates in a space, the slave apparatus and the master apparatus are desirably moored with each other by a mooring means such as a wire and a rope so that the slave apparatus go away from a certain area around the master apparatus. Especially in a situation, such as in cosmic space and under sea, where buoyancy force works or gravity does not work, the slave apparatus can floats and translates by releasing and by pulling and releasing the mooring means without any special propulsion device. In this case, the mooring means such as a wire and a rope correspond to the motion means of the slave apparatus. In the case that the slave apparatus and the master apparatus communicate by a wired communication, the communication wire can be used also as said mooring means.

A joystick controller, which control a linear translation forwardly and rearwardly, a curved translation leftwardly and rightwardly and moving upwardly and downwardly by operating one or more levers. In this case, proportional joystick controller, which conducts a proportional control, is desirably used.

And motion control signal generating means of the terminal apparatus can be configured to generate the motion control signal by detecting a position and a motion of user's body.

Especially in the case that the slave apparatus is configured to perform a rotational motion around its axis of rotation or around its center of rotation in addition to a translational motion, the slave apparatus can be configured to generate a translational motion control signal by said joystick controller and to generate a rotational motion control signal by detecting a motion of user's head, wherein "a translational motion" means "a translation in an orbit, on a surface or in a space", "a translational motion control signal" means "a signal to control a translational motion" and "a rotational motion control signal" means "a signal to control a rotational motion". And in this case, it is possible either that the terminal apparatus generates a secondary motion control signal on the basis of information represented by those signals and send it to a public network, or that the on-the-spot system receives those signals and set the display ranges of video signals on the base of the information represented by those signals. Especially in the latter case, the motion control signal sent from the terminal apparatus comprises a translational motion control signal and a rotational motion control signal.

Especially in the case that the video display means of the terminal apparatus is an HDM, the HMD can be configured so that an acceleration sensor and an orientation sensor are built in or attached to it and those sensors detect a motion of a user's head.

In the case that signals are exchanged between the slave apparatus and the terminal apparatus via the master apparatus or via the master apparatus and the relay apparatus, the master apparatus and/or the relay apparatus can conduct some sort of signal conversion. Therefore, "configuration to receive a signal (signals) via a public network and the master apparatus" or "configuration to receive a signal (signals) via a public network, the relay apparatus and the master apparatus" in DESCRIPTION and CLAIMS also implies "configuration that the master apparatus and/or the relay apparatus conducts signal conversion".

Especially, "configuration to receive a motion control signal via a public network and the master apparatus" or "configuration to receive a motion control signal via a public network, the relay apparatus and the master apparatus" in DESCRIPTION and CLAIMS also implies "configuration that the terminal apparatus sends a motion control primary signal, for example, which comprises a translational motion control signal and a rotational motion control signal, to the master apparatus, and the master apparatus converts the received motion control primary signal to a motion control secondary signal and sends to the slave apparatus.

In order to achieve above objectives, according to a tenth aspect of the present invention related to a live video distribution system, there is provided a live video distribution system according to the eighth or ninth aspect of the present invention, wherein said master apparatus has a function to generate an on-the-spot motion control signal and to send it to said slave apparatus, wherein "an on-the-spot motion control signal" means "individual signal to control a motion of said slave apparatus not on the basis of motion control information represented by said motion control signal".

In the tenth aspect of the present invention, the master apparatus can be configured to generate the on-the-spot motion control signal automatically on the basis of video information represented by the video signal received from the slave apparatus or by manual operation.

And the slave apparatus can be equipped with an approximation detection means which detects "positional relationship between master apparatus and itself" and/or "approximation situation or contiguity situation of obstacles including other slave apparatuses" and can be configured to control and can have a function to send the detection result from the approximation detection means to the master apparatus, and the master apparatus can be configured to generate the on-the-spot motion control signal automatically on the basis of the received result.

In the case that the slave apparatus receives a motion control signal not via the master apparatus but directly via a public network or via a public network and said relay apparatus (said Case III), the slave apparatus receive both of the motion control signal and the on-the-spot motion control signal. In this case, the slave apparatus is desirably configured so that its motion is controlled on the priority basis of the on-the-spot motion control signal.

In order to achieve above objectives, according to an eleventh aspect of the present invention related to a live video distribution system, there is provided a live video distribution system according to any one of the eighth to the tenth aspect of the present invention, said slave apparatus has a function to perform a motion independently neither on the basis of motion control information represented by said motion control signal nor on the basis of motion control information represented by said on-the-stop motion control signal.

In the eleventh aspect of the present invention, the slave apparatus can be configured to control automatically the motion means on the basis of the captured result from the image capturing means.

And slave apparatus can be equipped with an approximation detection means which detects "positional relationship between master apparatus and itself" and/or "approximation situation or contiguity situation of obstacles including other slave apparatuses" and can be configured to control automatically the motion means on the basis of detected result information form the approximation detection means.

In order to achieve above objectives, according to a twelfth aspect of the present invention related to a live video distribution system, there is provided a live video distribution system according to any one of the first to the eleventh aspect of the present invention, wherein said on-the-spot system is equipped with an audio signal generating means to collect sounds around the on-the-spot system and to generate an audio signal; wherein said terminal apparatus is equipped with a sound radiating means and the following functions: a function to receive an audio signal generated by an audio signal generating means of the on-the-spot system via a public network or via a public network and the relay apparatus; and a function to radiate sound on the basis of audio information of said received audio signal.

In the twelfth aspect of the present invention, the audio signal generating means of the on-the-spot system can comprise a plurality of microphone so as to send a stereo audio signal. And in this case, the terminal apparatus is desirably configured to radiate sounds from both of right side and left side of sound radiating parts.

In the twelfth aspect of the present invention, on-the-spot system can treat video information and audio information in an integrated manner by being configured to send a video/audio signal which is compressed and coded in the standard of MPEG.

The terminal apparatus is desirably equipped with a sound radiating means which radiates sounds on the basis of audio information represented by the audio signal received via a public network or via a public network and said relay apparatus.

In order to achieve above objectives, according to a thirteenth aspect of the present invention related to a live video distribution system, there is provided a live video distribution system according to any one of the first to the twelfth aspect of the present invention, wherein said on-the-spot system is transportable.

In order to achieve above objectives, according to a fourteenth aspect of the present invention related to a live video distribution system, there is provided a live video distribution system according to the first to the thirteenth aspect of the present invention, wherein said master apparatus is equipped with a long-distance transportation means.

In the fourteenth aspect of the present invention, a general-purpose long-distance transportation means such as an automobile, a ship, an aircraft, a submarine and a spacecraft can be used after modification, if necessary, as the long-distance transportation means of the master apparatus. The master apparatus can be transported by a manual operation of a driver on board of the master apparatus, by a manual operation of a driver off board of the master apparatus, or automatically.

In order to achieve above objectives, according to a fifteenth aspect of the present invention related to a live video distribution system, there is provided a live video multi distribution system by using a live video distribution system according to any one of the first to the fourteenth aspect of the present invention, which comprises: a plurality of said on-the-spot system that are located in separate places from each other; a plurality of said terminal apparatus; and wherein said terminal apparatus is equipped with a means to select any one of the on-the-spot systems.

Advantageous Effects of Invention

With the live video distribution system according to the present invention, the user can set the display range of the video signal of the system that is associated with the terminal device by hand, among the video signals generated by the video signal generating means of the on-the-spot system, and display the video image of an observation target within the display range on the video display means of the terminal apparatus at hand, by operating the display range setting signal generating means of the terminal apparatus at hand with a manual action or a body motion. Therefore, the user can observe the target to be observed in real time by itself. Since a plurality of users can set the display ranges of video images independently of each other, the users can simultaneously observe separate targets to be observed in real time by themselves. Since the systems of the video signals generated by the video signal generating means of the on-the-spot system and the terminal apparatus are associated with each other, the live video distribution system is free of such a problem that the display range of the video image displayed on the terminal apparatus at hand which is used by a user may be changed by a manual action or a body motion of another user.

Therefore, if the on-the-spot system is installed in an unexplored place or a frontier space such as cosmic space or deep sea and the terminal apparatus are installed at distant places, then the live video distribution system is capable of providing the users at the distant places with a "pseudo-sightseeing experience". Inasmuch as the users do not need to go to unexplored places or frontier spaces, rare natural environments and precious ruins are prevented from being destroyed. The cost of going to sightseeing spots is dispensed with, and excessive physical burdens imposed on the users owing to zero gravity and high atmospheric pressure, and the risk that the lives of the users may be put in jeopardy in the event that a transportation means for carrying the users to a sightseeing spot is broken are avoided or reduced.

As signals are exchanged between the on-the-spot system and the terminal apparatuses via a public network or via a public network and the relay apparatus, no problem arises even if the users who operate the terminal apparatuses are present at places that are distant from the spot where the observation target exists. In particular, if the Internet is used as the public network, then there is no distance limitation on the earth except for the problem of access to the Internet.

The live video distribution system according to the present invention is applicable to not only (pseudo-) tourism in unexplored places or frontier spaces but also (pseudo-) tourism in conventional tourist attractions. Furthermore, the live video distribution system is also applicable to inspection and monitoring in severe environment regions characterized by high or low temperatures, high contamination, or high radiation dosage, etc. With regard to inspection and monitoring in severe environment regions in particular, inasmuch as there is no need to stay on the spot or it is possible to propose the number of persons to be stayed on the spot or the number of days for which to stay on the spot, burdens on the bodies of those persons and the risk that the lives of those persons may be put in jeopardy due to staying on the spot are reduced.

According to the live video distribution system recited in the first aspect of the present invention, since the on-the-spot system directly accesses the public network, it is not necessary to provide a relay apparatus.

According to the live video distribution system recited in the second aspect of the present invention, since the on-the-spot system communicates with the relay apparatus, an observation target can be observed even if it exists in a region or area where there is no accessible public network, such as cosmic space or an undersea spot.

According to the live video distribution system recited in the third aspect of the present invention, since the display range of a video image displayed on the display means of each of the terminal apparatuses is set depending on the position and motion of the body of the user, the user can observe an observation target on the spot in a realistic fashion.

According to the live video distribution system recited in the fourth aspect of the present invention, since the motion of a body which cannot be realized without a body motion assisting means can be realized, and the display range of a video image displayed on the display means of each of the terminal apparatuses is set depending on the motion of the body, the live video distribution system can provide a variety of visual experiences. In particular, if the live video distribution system is installed on an undersea spot or in cosmic space and a pool filled with water is used as the body motion assisting means, then when the user swims in the water in the pool, the live video distribution system gives the user a "pseudo-sightseeing experience" as if the user is walking in space or swimming in deep sea.

According to the live video distribution systems recited in the fifth and sixth aspects of the present invention, each of the slave apparatuses of the on-the-spot system determines the image capturing range of the image capturing means on the basis of display range setting information represented by the display range setting signal that is generated by the display range setting signal generating means of the terminal apparatus associated with the slave apparatus, and generates a video signal on the basis of the captured result by the image capturing means, so that the on-the-spot system can generate the video signals of the plurality of systems having the different display ranges. Therefore, even if many users use the terminal apparatuses and it is necessary to generate and send video signals of many systems, such a requirement can easily be met by increasing slave apparatuses.

According to the live video distribution systems recited in the seventh aspect of the present invention, even if the vantage point of the image capturing means is not moved by a motion of each slave apparatus, the display range of the video image can be changed. Therefore, an observation target can quickly be changed insofar as it is present in the periphery of the slave apparatus.

According to the live video distribution systems recited in the eighth and ninth aspects of the present invention, as the slave apparatuses can move, the vantage point of the image capturing device of each slave apparatus can freely be moved. Consequently, the user can observe an observation target that exists in a wide range. In particular, if the slave apparatus has a function to levitate from the ground into the air, then it is possible to observe the ground from the air. If the slave apparatus has a function to float in cosmic space or sea, then the live video distribution system can give the user a pseudo-experience as if the user is walking in space or swimming in the sea.

According to the live video distribution systems recited in the tenth aspect of the present invention, each of the slave apparatus can move based on not only a motion control signal generated as a result of a manual action or body motion of the user that is present at a distant place, but also an on-the-spot motion control signal generated by the master apparatus and sent to the slave apparatus. Therefore, when a monitoring person or sensor on the spot detects the positional relationship between the slave apparatuses or the positional relationship between the slave apparatuses and the master apparatus or other obstacles, and the master apparatus sends an on-the-spot motion control signal on the basis of the detected result, a collision between the slave apparatuses or a collision between the slave apparatuses and the master apparatus or other obstacles can be avoided.

According to the live video distribution systems recited in the eleventh aspect of the present invention, each of the slave apparatus can move not only based on a motion control signal sent from the terminal apparatus present at a distant place and an on-the-spot motion control signal sent from the master apparatus, but also autonomously. Therefore, the slave apparatuses are able to avoid a collision between the slave apparatuses or a collision between the slave apparatuses and the master apparatus or other obstacles, on the basis of the autonomous motion of themselves.

According to the live video distribution systems recited in the twelfth aspect of the present invention, the user present at a distant place is capable of not only visually observing an observation target on the spot, but also audibly recognizing the situation on the spot. If the on-the-spot system is installed on a sightseeing spot (including unexplored spots and frontier spaces), then the live video distribution system can give the user a "pseudo-sightseeing experience" with an increased realistic feeling.

According to the live video distribution systems recited in the thirteenth aspect of the present invention, the on-the-spot system can be moved to various places and used therein.

According to the live video distribution systems recited in the fourteenth aspect of the present invention, the on-the-spot system can be moved to a place where an observation target exists by the long-distance transportation means of the master apparatus. If a general-purpose long-distance transportation means such as an automobile, a ship, an aircraft, a submarine, a spacecraft, or the like is used as the long-distance transportation means of the master apparatus, in particular, then providing the slave apparatuses are reduced in size and weight, more slave apparatuses can be carried on the general-purpose long-distance transportation means than a human being is actually on board the general-purpose long-distance transportation means.

According to the live video distribution systems recited in the fifteenth aspect of the present invention, as the on-the-spot systems are installed on different sightseeing spots (including unexplored places and frontier spaces) and the terminal apparatuses select the on-the-spot systems, the live video distribution system can give the users who stay in one place "pseudo-sightseeing experiences" at a plurality of sightseeing spots.

DESCRIPTION OF EMBODIMENTS

Embodiments of the present invention will be described below with reference to the drawings. However, the present invention is not limited to those embodiments, but various changes may be made within the scope of the technical idea of the present invention.

Embodiment 1

Figure 1:
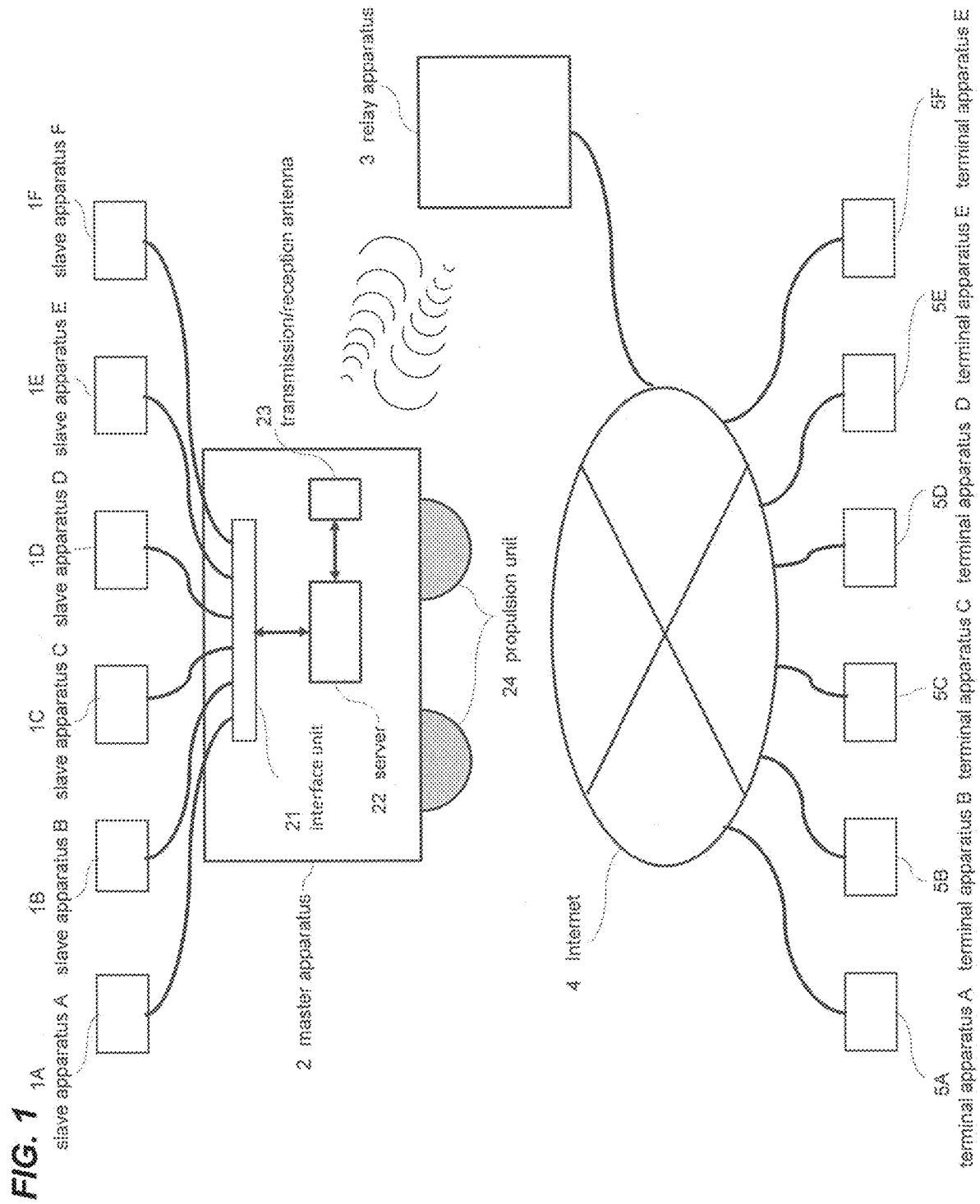
FIG. 1 is a block diagram illustrating the arrangements and functions of a live video distribution system according to Embodiment 1 of the present invention.

FIG. 1 is a block diagram illustrating the arrangements and functions of a live video distribution system according to Embodiment 1 of the present invention.

According to the present embodiment, the live video distribution system comprises an on-the-spot system including slave apparatuses A_1A through F_1F and a master apparatus 2, a relay apparatus 3, and terminal apparatuses A_5A through F_5F.

The slave apparatuses A_1A through F_1F are carried on the master apparatus 2 that moves on land and move a long distance to the spot (e.g., sightseeing spots including unexplored places, severe environment regions characterized by high or low temperatures, high contamination, or high radiation dosage, etc.). After having reached the spot, the slave apparatuses A_1A through F_1F are ejected from the master apparatus 2, and linearly translate forwardly, rearwardly, upwardly and downwardly, swing upwardly, downwardly, leftwardly and rightwardly, or rotate about their own rotational axes or about some centers of rotation. Since the slave apparatuses A_1A through F_1F and the master apparatus 2 are connected by cables, the slave apparatuses A_1A through F_1F are movable only in a range as far as the cables can extend.

The master apparatus 2 and the relay apparatus 3 exchange information by way of wireless communication, and the relay apparatus 3 and the terminal apparatuses A_5A through F_5F exchange information between themselves and the Internet 4.

The slave apparatuses A_1A through F_1F are assigned respective identification numbers that are defined in the on-the-site system, whereas communication units that make up the terminal apparatuses A_5A through F_5F are given respective IP addresses. The identification numbers and the IP addresses are correlated with each other thereby correlating the slave apparatus A_1A and the terminal apparatus A_5A with each other, the slave apparatus B_1B and the terminal apparatus B_5B with each other, the slave apparatus C_1C and the terminal apparatus C_5C with each other, the slave apparatus D_1D and the terminal apparatus D_5D with each other, the slave apparatus E_1E and the terminal apparatus E_5E with each other, and the slave apparatus F_1F and the terminal apparatus F_5F with each other.

The slave apparatuses A_1A through F_1F have main rotors and tail rotors as is the case with an ordinary helicopter, so that they can float in the air, translate linearly, swing, and rotate upon rotation of those rotors. The slave apparatuses A_1A through F_1F also have motion control means which control the rotational speeds, pitch angles, and tilts of rotational planes of the rotors on the basis of the motor control secondary signals sent from the master apparatus 2 through the cables.

Each of the slave apparatuses A_1A through F_1F further includes two CMOS camera modules and a video signal converting means for converting captured-image electric signals from two image sensors into uncompressed 3D video signals. The slave apparatuses A_1A through F_1F send the generated uncompressed 3D video signals to the master apparatus 2 through the cables.

In the present embodiment, the CMOS camera modules are used as image capturing means. However, other image capturing means (e.g., CCD camera modules or the like) may be used.

Moreover, the slave apparatuses A_1A through F_1F include proximity determining means for determining whether they are close to the other slave apparatuses, the master apparatus, or other obstacles, on the basis of video information represented by the uncompressed video signals generated by the image sensors and the video signal converging means. Based on the determined result from the proximity determining means in addition to the motion control secondary signal sent from the master apparatus 3, the motion control means controls the rotational speeds, pitch angles, and tilts of rotational planes of the rotors, thereby avoiding contact with the other slave apparatuses, the master apparatus, or other obstacles.

The slave apparatuses A_1A through F_1F have microphones, and send audio signals collected thereby to the master apparatus 2 through the cables.

The uncompressed 3D video signals and the audio signals are transmitted as HDMI (registered trademark) (High-Definition Multimedia Interface) signals or MHL (registered trademark) (Mobile High-definition Link) signals. While wired transmission using the cables is employed in the present embodiment, it is also possible to employ wireless communication according to standards such as Wireless HD or WHDI (Wireless Home Digital Interface) instead.

The master apparatus 2 has an interface unit 21 for sending motion control secondary signals to the slave apparatuses A_1A through F_1F and receiving uncompressed 3D video signals and audio signals from the slave apparatuses A_1A through F_1F. The master apparatus 2 also has a server 22 for processing information, a transmission/reception antenna 23 for exchanging wireless signals with the relay apparatus 2, and a propulsion unit 24 for moving the master apparatus 2 over a long distance.

The propulsion unit 24 comprises wheels and a drive means therefor (a prime mover and/or an electric motor, a transmission, etc.) similar to those on ordinary automobiles. The propulsion unit 24 may be actuated manually by the driver on the master apparatus 2, or may be actuated under remote control, or may be actuated automatically. If the propulsion unit 24 is actuated under remote control or is actuated automatically, the drive means is controlled by signals from the server 22.

On the basis of the motion control primary signals received from the transmission/reception antenna 23, the server 22 generates motion control secondary signals for controlling motion of the slave apparatuses A_1A through F_1F, and sends the motion control secondary signals to the respective ports of the interface 21 to which the slave apparatuses A_1A through F_1F are connected. The motion control secondary signals include information about the rotational speeds, pitch angles, and tilts of rotational planes of the rotors.

The motion control primary signals are associated with the IP addresses given to the communication units of the terminal apparatuses that have sent the motion control primary signals. On the basis of the IP addresses, the server 22 sends the motion control secondary signals to the ports of the interface 21 to which the slave apparatuses A_1A through F_1F with the corresponding identification numbers assigned thereto are connected.

The server 22 receives, from the interface 21 to which the slave apparatuses are connected, uncompressed 3D video signals converted by the video signal converting means from captured-image electric signals captured by the image sensors of the slave apparatuses A_1A through F_1F and audio signals collected by the microphones of the slave apparatuses A_1A through F_1F, convert the uncompressed 3D video signals and the audio signals into video signals and audio signals that can be streamed, and send the video signals and audio signals to the transmission/reception antenna 23. In particular, the server 22 performs a compressing and encoding process on the uncompressed 3D video signals and sends the compressed 3D video signals.

When the server 22 is to send the compressed 3D video signals and the audio signals, the server 22 determines terminal apparatuses as final destinations on the basis of the identification numbers of the slave apparatus that are connected to the respective ports of the interface 21, and sends the compressed 3D video signals and the audio signals as signals in accordance with the Internet protocol where the IP addresses assigned to the communication units of the determined terminal apparatuses are used as destination IP addresses.

The server 22 has a proximity determining function to determine whether the slave apparatuses are close to the other slave apparatuses, the master apparatus, or other obstacles, on the basis of the uncompressed 3D video signals received from the interface 21. On the basis of the result determined by the proximity determining function in addition to the motion control primary signals received from the transmission/reception antenna 23, the server 22 generates motion control secondary signals and sends the generated motion control secondary signals to the interface 21. Therefore, the slave apparatuses are capable of avoiding contact with the other slave apparatuses, the master apparatus, or other obstacles.

The transmission/reception antenna 23 sends the uncompressed 3D video signals and the audio signals received from the server 22 as mobile signals for 3G, LTE, or the like to the relay apparatus 3.

The relay apparatus 3, which serves as a mobile base station, receives the mobile signals sent from the transmission/reception antenna 23, converts the mobile signals as required, and sends the converted mobile signals to the Internet 4.

Each of the terminal apparatuses A_5A through F_5F comprises an operation controller, a communication unit with an assigned IP address, an immersive 3D-HMD, and a set of headphones.

As is the case with the proportional joystick controller of an ordinary radio-controlled helicopter, the operation controller generates a motion control primary signal based on a lever action and a dial action taken by the user and sends the generated motion control primary signal to the communication unit.

The communication unit converts the motion control primary signal received from the operation controller into a signal in accordance with the Internet protocol where the given IP address is used as a source IP address, and sends the converted signal through a built-in Internet interface to the Internet.

The communication unit also receives the compressed 3D video signal and the audio signal streamed from the Internet through the built-in Internet interface, decodes the compressed 3D video signal and the audio signal as required, and sends the decoded 3D video signal and audio signal to the HMD and the headphones. In particular, the communication unit performs an expanding decoding process on the compressed 3D video signal and sends the processed 3D video signal as an uncompressed 3D video signal.

On the basis of the uncompressed 3D video signal received from the communication unit, the HMD projects video images from left and right projection units for thereby allowing the user to enjoy a 3D video image including an observation target on the spot. On the basis of the audio signal received from the communication unit, the headphones radiate sounds from left and right sound radiation units for thereby allowing the user to enjoy sounds on the spot.

The HMD and the headphones may be constructed as a unitary device. In such a case, the uncompressed 3D video signal and the audio signal that have been decoded by and sent from the communication unit may be transmitted as an HDMI signal or an MHL signal through a wired link. Alternatively, those signals may be transmitted as a Wireless HD signal or a WHDI signal through a wireless link.

According to the present embodiment, the motion control primary signals are generated by the user moving the operation controller. However, the HMD may be accompanied by or may incorporate an acceleration sensor and an orientation sensor, and the motion control primary signals may be generated on the basis of the detected results from those sensors.

The user with the HMD and the headphones worn thereby may move up and down or rotate with the assistance of a body motion assisting means such as a trampoline or a bungee cord. In this case, since the left and right projection units of the HMD display video images linked with the body motion of the user, the user can enjoy the video images in a realistic fashion as if the user is moving up and down and rotating on the spot (including sightseeing spots including unexplored places).

If the body motion of the user is too vigorous and the line of sight of the user moves abruptly, then the line of sight of the CMOS camera module of the slave apparatus may not be able to follow up. Such a follow-up delay can be avoided by using a whole-sky camera covering 360° as an angle of view (solid angle) as an image capturing means and generating an electric signal captured in an image capturing range corresponding to the line of sight of the user or electronically generating a video signal covering the display range corresponding to the line of sight of the user.

The slave apparatuses and the terminal apparatuses according to the present embodiment may be used as pairs. In this case, of the functions of the master apparatus, those functions other than a long distance moving function of the propulsion unit 24, i.e., a signal converting function and a communicating function of the server 22 and the communication antenna 23, may be carried out by the slave apparatuses.

Embodiment 2

Figure 2:
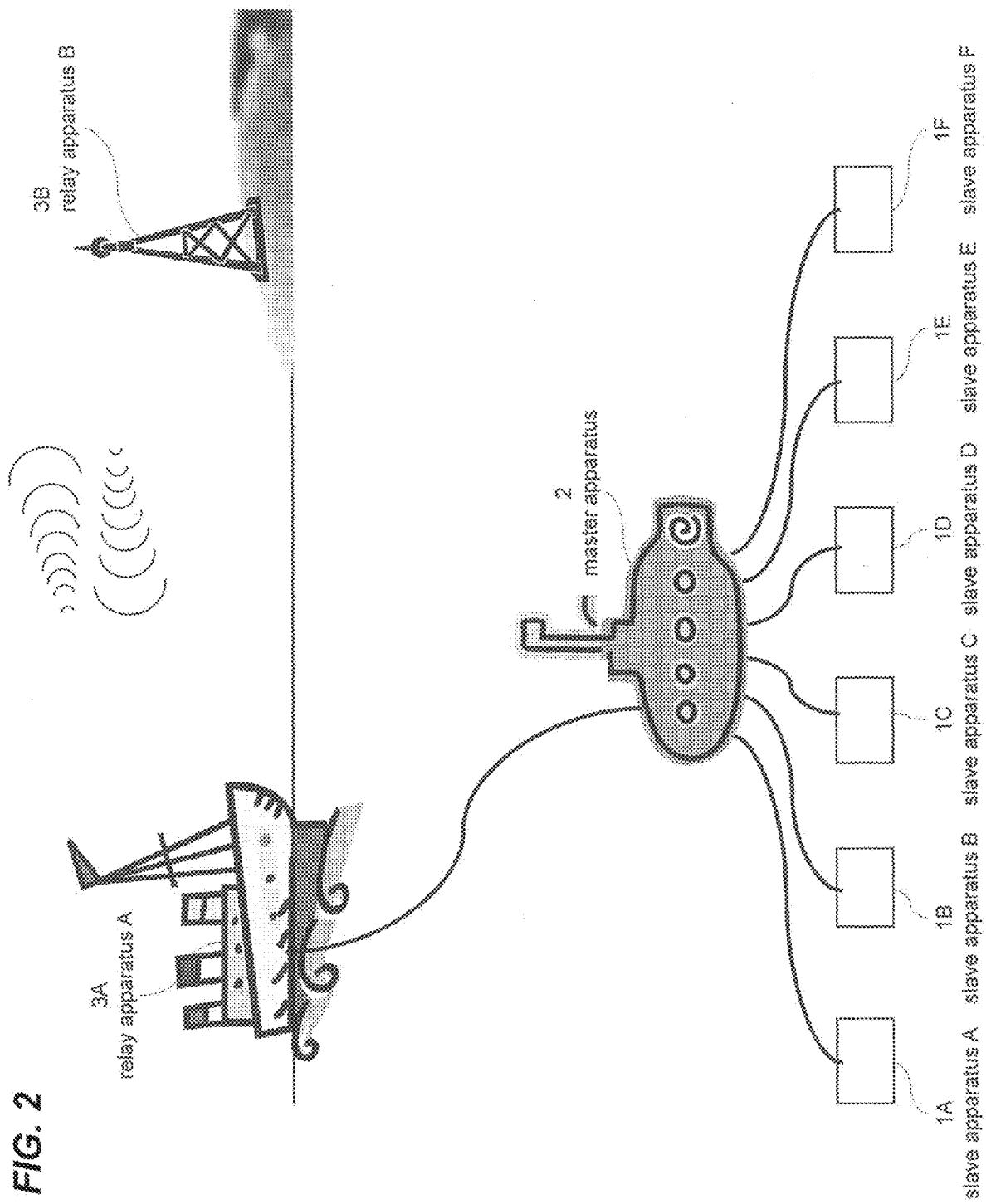
FIG. 2 is a schematic view illustrating the arrangements and functions of an on-the-spot system (a master apparatus and slave apparatuses) and a relay apparatus of a live video distribution system according to Embodiment 2 of the present invention.

FIG. 2 is a schematic view illustrating the arrangements and functions of an on-the-spot system (a master apparatus and slave apparatuses) and a relay apparatus of a live video distribution system according to Embodiment 2 of the present invention. According to the present embodiment, the live video distribution system comprises an on-the-spot system including slave apparatuses A_1A through F_1F and a master apparatus 2, a relay apparatus A_3A and a relay apparatus B_3B, and terminal apparatuses A_5A through F_5F (not shown).

The slave apparatuses A_1A through F_1F are carried on the master apparatus 2 that moves on and below the surface of the sea, and moves a long distance to a spot in deep sea. After having reached the spot, the slave apparatuses A_1A through F_1F are ejected from the master apparatus 2, and translate forwardly, rearwardly, upwardly and downwardly, or rotate. Since the slave apparatuses A_1A through F_1F and the master apparatus 2 are connected by cables, the slave apparatuses A_1A through F_1F are movable only in a range as far as the cables can extend.

The master apparatus 2 and the relay apparatus A_3A exchange information through a cable, the relay apparatus A_3A and the relay apparatus B_3B exchange information by way of wireless communication, and the relay apparatus B_3B and the terminal apparatuses A_5A through F_5F (not shown) exchange information between themselves and the Internet 4.

The slave apparatuses A_1A through F_1F and the terminal apparatuses A_5A through F_5F (not shown) are assigned respective identification numbers and IP addresses, and are associated with each other in the same manner as with Embodiment 1.

The arrangements and functions of the slave apparatuses A_1A through F_1F are basically the same as those of Embodiment 1. However, the slave apparatuses A_1A through F_1F move in the sea by rotating screw propellers, changing the angles of their helms, and introducing and discharging seawater.

The master apparatus 2 comprises a submarine that can navigate by itself on and below the surface of the sea, and houses therein an interface 21 and a server 22 (not shown) having the same functions as with Embodiment 1. Unlike Embodiment 1, however, the master apparatus 2 has an interface connected to the cable that is connected to the relay apparatus A_3A, rather than a transmission/reception antenna.

The relay apparatus A_3A comprises a communication ship anchored on the surface of the sea above the master apparatus 2. The relay apparatus A_3A exchanges video signals, audio signals, and motion control signals with the master apparatus 2 through a cable, and exchanges video signals, audio signals, and motion control signals with the relay apparatus B_3B by way of wireless communication. The relay apparatus B_3B comprises a mobile base station on land, and has the same functions as those of the relay apparatus 3 according to Embodiment 1.

Each of the terminal apparatuses A_5A through F_5F comprises a headphone-integrated HMD housing therein a control unit, a communication unit, an acceleration sensor, and an orientation sensor. The headphone-integrated HMD is of water-resistant specifications, so that the user can wear the headphone-integrated HMD on its head and swims in the water in a pool while wearing necessary diving equipment.

The control unit identifies the position of the head of the user and the direction of the face (line of sight) thereof on the basis of signals from the acceleration sensor and the orientation sensor, generates a motion control primary signal based on the identified results, and sends the generated motion control primary signal to a transmission unit. As with Embodiment 1, the transmission unit sends the received motion control primary signal through a built-in Internet interface to the Internet.

Video images are projected on the left and right projection units of the headphone-integrated HMD on the basis of an uncompressed 3D video signal received from the communication unit. Since the video images change in relation to the movement of the position of the head of the user and the direction of the face (line of sight) thereof which have been identified by the control unit, the user can enjoy the video images with such a feeling as if the user is swimming in deep seawater.

The slave apparatuses and the terminal apparatuses (headphone-integrated HMDs) according to the present embodiment may be used as pairs. In this case, of the functions of the master apparatus, a signal converting function and a communicating function of the server 22 and the communication antenna 23 may be carried out by the slave apparatuses.

The terminal apparatuses (headphone-integrated HMDs) according to the present embodiment may be used independently of the on-the-spot system of the live video distribution system according to the present invention. For example, images of the scene of a sightseeing spot may be captured at various positions and angles by a number of image capturing means, and the terminal apparatus may be used in combination with a free viewpoint video generating apparatus that generates a video signal at a free viewpoint on the basis of the number of acquired image data. The free viewpoint video generating apparatus generates a video signal based on viewpoint information represented by the motion control primary signal that is generated by the controller of the headphone-integrated HMD.

Embodiment 3

Figure 3:
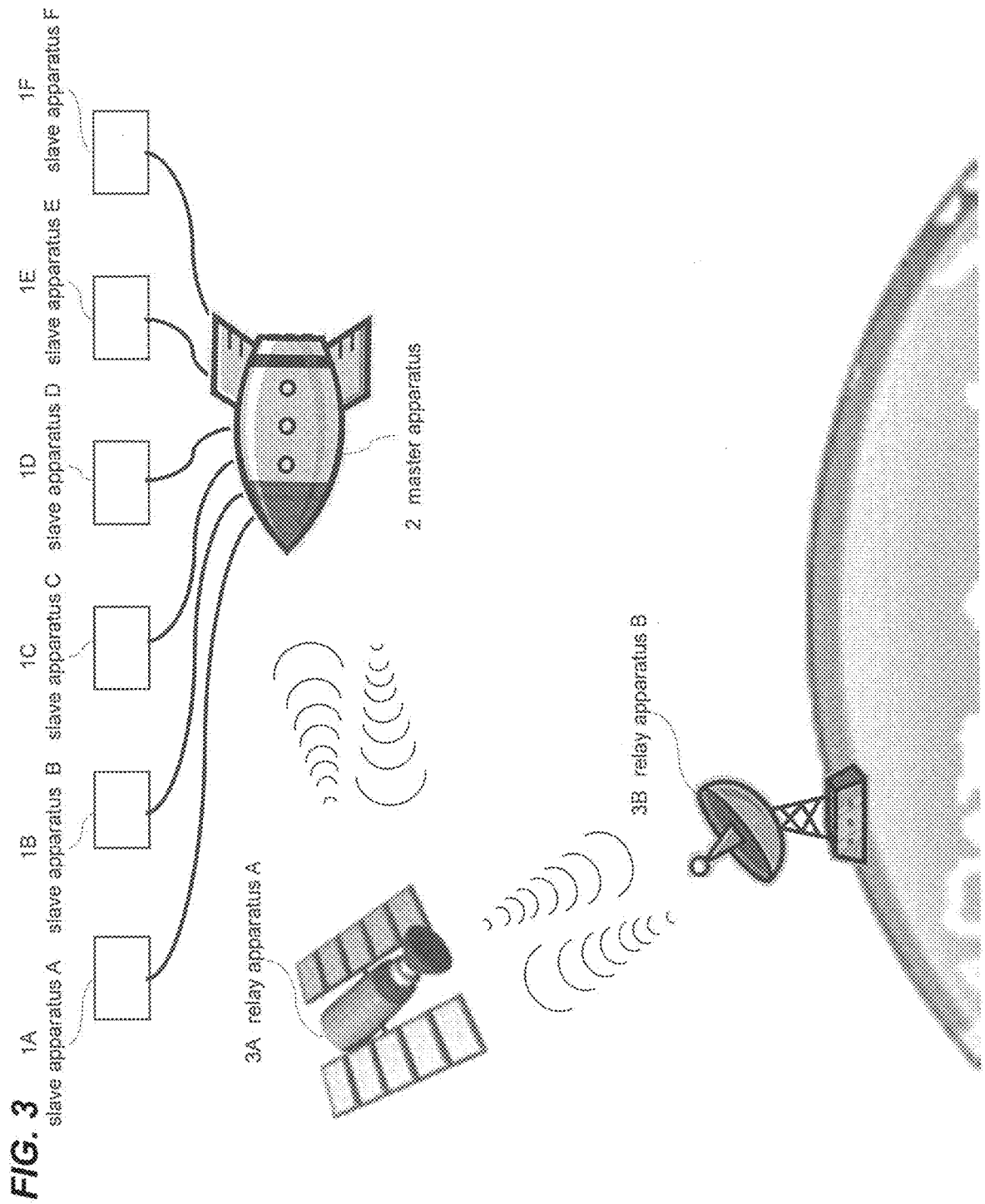
FIG. 3 is a schematic view illustrating the arrangements and functions of an on-the-spot system (a master apparatus and slave apparatuses) and a relay apparatus of a live video distribution system according to Embodiment 3 of the present invention.
Figure 4:
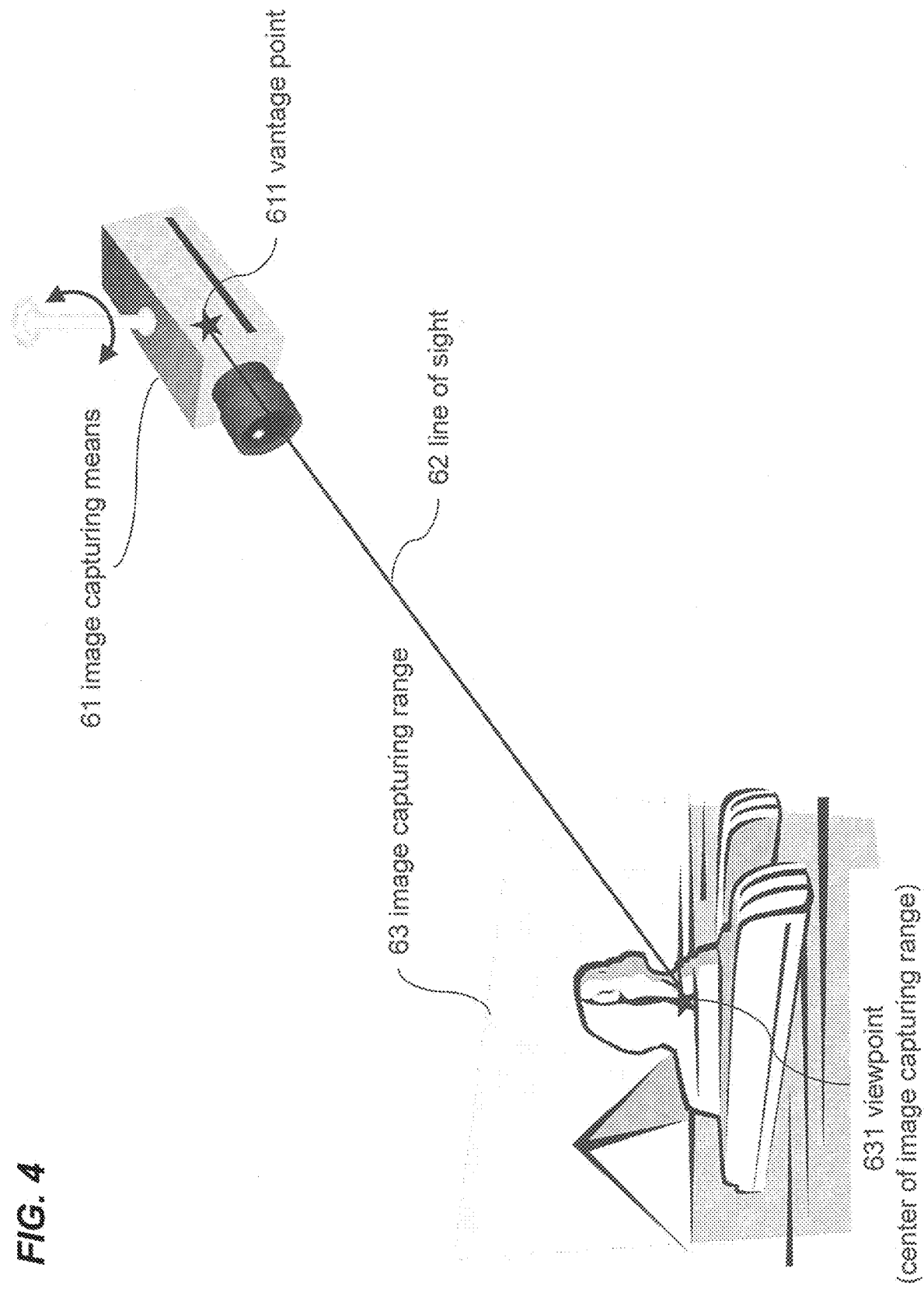
FIG. 4 is a view illustrating the image capturing range of an image capturing means, a vantage point, a line of sight, and a viewpoint (center of the image capturing range).

FIG. 3 is a schematic view illustrating the arrangements and functions of an on-the-spot system (a master apparatus and slave apparatuses) and a relay apparatus of a live video distribution system according to Embodiment 3 of the present invention.

According to the present embodiment, the live video distribution system comprises an on-the-spot system including slave apparatuses A_1A through F_1F and a master apparatus 2, a relay apparatus A_3A and a relay apparatus B_3B, and terminal apparatuses A_5A through F_5F (not shown).

The slave apparatuses A_1A through F_1F are carried on the master apparatus 2 that flies within and outside of the atmosphere, and moves a long distance to a spot outside of the atmosphere. After having reached the spot, the slave apparatuses A_1A through F_1F are ejected from the master apparatus 2, and translate forwardly, rearwardly, upwardly and downwardly, or rotate. Since the slave apparatuses A_1A through F_1F and the master apparatus 2 are connected by cables, the slave apparatuses A_1A through F_1F are movable only in a range as far as the cables can extend.

The master apparatus 2 and the relay apparatus A_3A, and the relay apparatus A_3A and the relay apparatus B_3B exchange information by way of wireless communication, and the relay apparatus B_3B and the terminal apparatuses A_5A through F_5F (not shown) exchange information between themselves and the Internet 4.

The slave apparatuses A_1A through F_1F and the terminal apparatuses A_5A through F_5F (not shown) are assigned respective identification numbers and IP addresses, and are associated with each other in the same manner as with Embodiment 1.

The arrangements and functions of the slave apparatuses A_1A through F_1F are basically the same as those of Embodiment 1. However, the slave apparatuses A_1A through F_1F move outside of the atmosphere by means of jet propulsion.

The master apparatus 2 comprises a spacecraft that can fly out of the atmosphere, and houses therein an interface 21 and a server 22 (not shown) having the same functions as with Embodiment 1. And the master apparatus 2 exchanges wireless signals with the relay apparatus A_3A in the same manner as with Embodiment 1. The master apparatus 2 may be arranged such that it separates from a rocket (part of "long-distance transportation means" recited in the present description and the scope of claims for patent) that was used when the master apparatus 2 blasted off.

The relay apparatus A_3A, which serves as a communication satellite that exists outside of the atmosphere, exchanges video signals, audio signals, and motion control signals with the master apparatus 2 and the relay apparatus B_3B by way of wireless communication. The relay apparatus B_3B comprises a mobile base station on land, and has the same functions as those of the relay apparatus 3 according to Embodiment 1.

The terminal apparatuses A_5A through F_5F (not shown) basically have the same arrangements and functions as those of Embodiment 2. The Video images are projected on the left and right projection units of the headphone-integrated HMD on the basis of an uncompressed 3D video signal received from the communication unit. Since the video images change in relation to the movement of the position of the head of the user and the direction of the face (line of sight) thereof which have been identified by the control unit, the user can enjoy the video images with such a feeling as if the user is walking in cosmic space.

INDUSTRIAL APPLICABILITY

The present invention can be used in an industry which manufactures apparatuses regarding a video signal generating means (an image capturing means, a video signal converting means, a motion means), an audio signal generating means and a communicating means of an on-the-spot system, and a display range setting signal generating means (a body detecting means, a motion control signal generating means), a video display means, a sound radiating means, and a communicating means of a terminal apparatus. The present invention can also be used in an industry which manufactures an automobile, a ship, or a spacecraft (including a rocket for delivering a spacecraft out of the atmosphere) that can be used as a long-distance transportation means of an on-the-spot system. The present invention can also be used in an industry which provides a service (especially, a sight-seeing service) regarding an observation using a live video distribution system.

REFERENCE SIGNS LIST

1A . . . slave apparatus A
1B . . . slave apparatus B
1C . . . slave apparatus C
1D . . . slave apparatus D
1E . . . slave apparatus E
1F . . . slave apparatus F
2 . . . master apparatus
21 . . . interface unit
22 . . . server
23 . . . transmission/reception antenna
24 . . . propulsion unit
3 . . . relay apparatus
3A . . . relay apparatus A
3B . . . relay apparatus B
4 . . . Internet
5A . . . terminal apparatus A
5B . . . terminal apparatus B
5C . . . terminal apparatus C
5D . . . terminal apparatus D
5E . . . terminal apparatus E
5F . . . terminal apparatus F
61 . . . image capturing means
611 . . . vantage point
62 . . . line of sight
63 . . . image capturing range
631 . . . viewpoint (center of image capturing range)

The invention claimed is:

1. An on-the-spot system comprising:
a plurality of slave apparatuses; and
a master apparatus, the master apparatus to be located in a spot and equipped with a first antenna to exchange signals with one or more of said plurality of slave apparatuses and a second antenna to transmit a video signal addressed to one or more of a plurality of terminal apparatuses at distant places;
each of said plurality of slave apparatuses to be equipped with a camera to image a target in the spot and a third antenna to exchange signals with the master apparatus,
wherein each of said plurality of slave apparatuses is configured to generate a video signal on the basis of a captured result from said camera and to transmit the video signal to said master apparatus;
wherein said master apparatus is configured to:
associate at least some of said plurality of slave apparatuses with a respective one of said plurality of terminal apparatuses; and
receive a display range setting signal from each respective one of said plurality of terminal apparatuses;
process the display range setting signal as necessary to generate a processed display range setting signal; and
transmit the received display range setting signal or the processed display range setting signal to the associated slave apparatus of the respective one of said plurality of terminal apparatuses, and
wherein said master apparatus and each respective one of said plurality of slave apparatuses are configured to change a display range of the video signal transmitted to said one or more of said plurality of terminal apparatuses based on display range setting information represented by the display range setting signal,
wherein said master apparatus is configured to:
receive the video signal from said at least some of said plurality of slave apparatuses;
process the video signal as necessary to generate a processed video signal; and
transmit the received video signal from said at least some of said plurality of slave apparatuses or the processed video signal from said at least some of said plurality of slave apparatuses, having different display ranges, addressed to said respective one of said plurality of terminal apparatuses simultaneously in real time.

2. The on-the-spot system according to claim 1, wherein said master apparatus is further configured to:
process the display range setting signal from each associated respective one of said plurality of terminal apparatuses a to generate line-of-sight setting signals and vantage point setting signals; and
transmit the line-of-sight setting signals to a respective one of said plurality of slave apparatuses; and
wherein each of said at least some of said plurality of slave apparatuses is further configured to:
change a line-of-sight of the camera based on line-of-sight setting information represented by the line-of-sight setting signal;
perform a motion based on vantage point setting information represented by the vantage point setting signal; and
change a vantage point of said camera according to the motion.

3. The on-the-spot system according to claim 1, wherein each of said plurality of slave apparatuses is equipped with a propulsion device configured to float and perform a motion over the spot outside of said master apparatus independently of each other.

* * * * *